S. B. WILLIAMS.
Smut Machine.
No. 53,720.
Patented April 3, 1866.
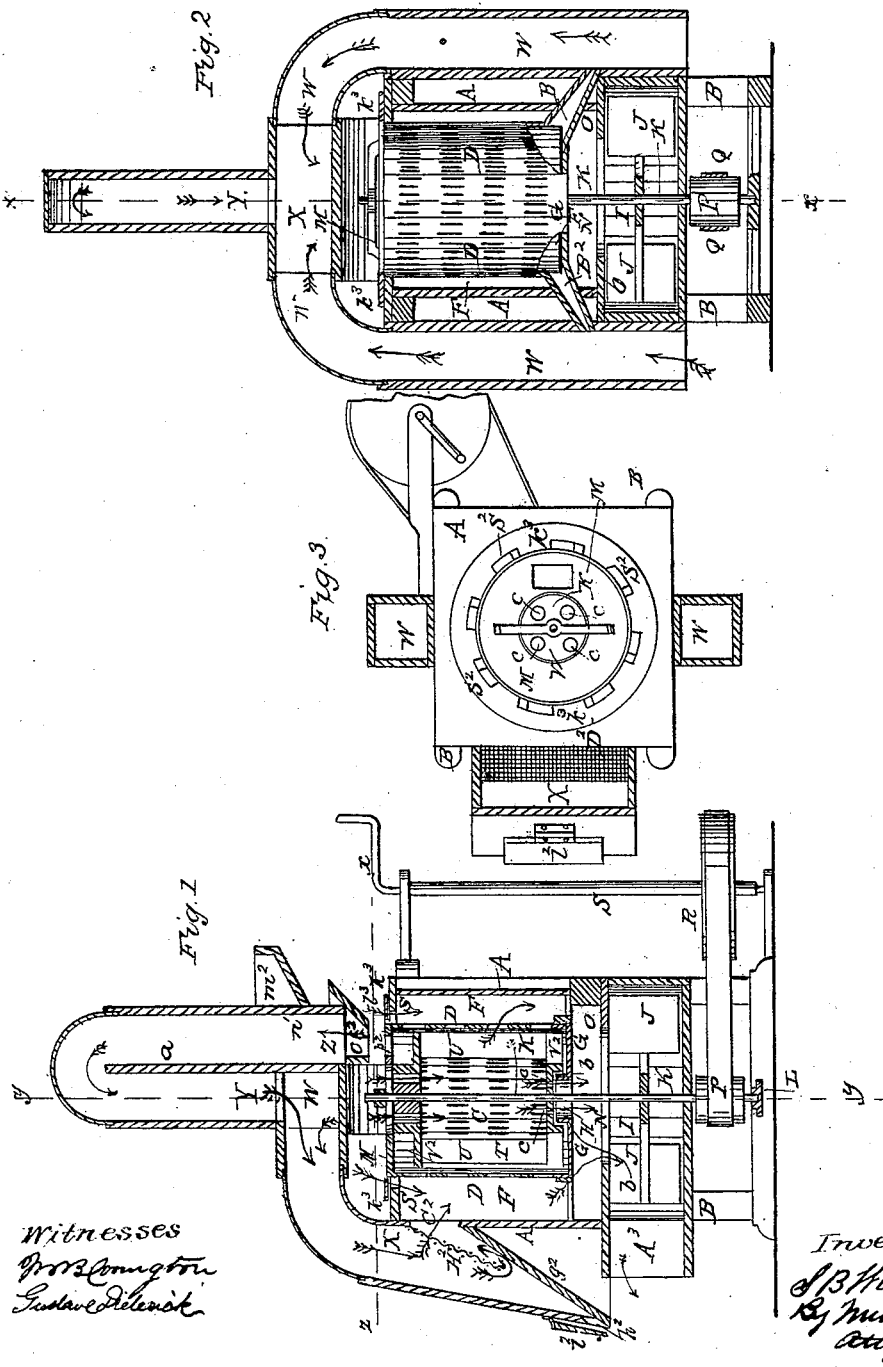

ns in the upper head-plate communi-# UNITED STATES PATENT OFFICE.

S. B. WILLIAMS, OF WHEELING, WEST VIRGINIA.

IMPROVEMENT IN SMUT-MACHINES.

Specification forming part of Letters Patent No. 53,720, dated April 3, 1866.

*To all whom it may concern:*

Be it known that I, S. B. WILLIAMS, of Wheeling, in the county of Ohio and State of West Virginia, have invented a new and Improved Smut-Machine; and I do hereby declare that the following is a full, clear, and exact description thereof, which will enable others skilled in the art to make and use the same, reference being had to the accompanying drawings, forming part of this specification.

This invention consists in subjecting wheat or grain, for scouring and cleansing it of impurities, in its passage to and while being acted upon by the beaters in the beater-chamber, having its sides perforated, and also as it escapes therefrom, to the action of a draft or drafts of air in a downward direction, both upon the inside and outside of the said beater-chamber, produced by a fan-blower or other suitable device arranged in the lower portion of the machine and below the beater-chamber, the whole machine, for this purpose, being constructed, arranged, and operating in the manner to be now fully described, reference being had to the accompanying plate of drawings, of which—

Figure 1 is a central longitudinal vertical section of the smut-machine, taken in the plane of the line $x\, x$, Fig. 2; Fig. 2, a central transverse vertical section taken in the plane of the line $y\, y$, Fig. 1; and Fig. 3 a horizontal section taken in the plane of the line $z\, z$, Fig. 2.

A A, in the drawings, represent the outer casing or box of the machine, made of a square shape, secured to and supported by parallel upright frames B B.

Within the box A, and extending from the bottom to the top of the same, is an inner chamber, C, having its side D perforated, and with a space, F, entirely around the exterior, between it and the box, and also underneath its lower or bottom plate, G, the perforated chamber being supported upon cross-pieces of the box, and with an opening, H, in the center of its said bottom plate, G, having a raised lip, $b$, entirely around it.

Below the box A is arranged, in the chamber or box I, a fan-blower, J, attached to a vertical shaft, K, extending up through the center of the perforated box-chamber C, and turning in bearings, at its lower end, of the cross-piece L of the supporting-frames B, and at its upper end in the top or cover plate, M, of the perforated chamber C.

N is an opening in central portion of bottom piece, O, of the outer box or casing, forming communication between the fan-blower chamber and the interior of the box.

On fan-blower shaft K, at its lower end, is secured a pulley, P, connected, through a belt, Q, with the pulley R of the driving-shaft S, to which motion may be imparted in any proper manner.

Within the perforated chamber C, and secured to and revolving with the fan-blower shaft K, is a beater device, T, consisting of a series of vertical plates, U U, arranged between two heads, V V², having apertures $c\, c$ through the central portions of each, the apertures in the lower head, V², forming communication between the interior space about the beater-plates U U, and the chamber F about the perforated cylinder, before referred to, and the apertures in the upper head-plate communicating, also, with the space about the beater-plates and with the space above the perforated cylinder, as will be seen by an inspection of Fig. 1.

Upon opposite sides of the outer casing, A, are similar spouts, W W, each extending from the lower end of the box up along its sides and over its top, where they open into a common spout passing down one of the other sides of the box A to or near the bottom edge of the same.

Extending upward from the common spout X, at the point where the side spouts, W W, join the same, is a spout, Y, opening at its end Z, just above the perforated cylinder, this spout being divided into two, communicating at their upper ends with each other by a central partition-plate, $d$.

The spouts W W are both open at their lower ends, and each have a spout, B², connecting them with the interior of the perforated cylinder.

The common spout X communicates with the space F about the perforated cylinder, at or near its upper end, through an opening, C², in front of which, in the spout, a sieve or separator, D², is placed in an inclined position, with a space, $f^2$, between its lower end and the inclined bottom and closing end piece, $g^2$, of the spout, at the lower edge of which is a discharge-orifice, $h^2$, opened and closed, as may be desired, by a hinged lid, $l^2$.

Attached to the spout Y, at or near the point where it opens to the top of the perforated cylinder, is a trough, $m^2$, into which the wheat or grain to be cleansed of impurities, such as smut, cheat, white-laps, shriveled wheat, dust, &c., is poured, passing therefrom, through the opening $n^2$ of the spout Y, into the same, where, falling down into the hopper $O^2$ on the lower end of the spout Y, escapes therefrom, through the opening $p^2$ in the cover-plate M of the perforated cylinder, into the interior of the same, from whence it passes out through the delivery-spouts $B^2$ $B^2$ into the side spouts, W W. But while the wheat or grain is passing from the trough $m^2$ to and through the perforated cylinder the fan-blower J and also beater U are both revolved at a high rate of speed, the blower thus producing a suction or blast of air up through the side spouts, W W, uniting at their upper ends in the common spout X, whence it then passes down through the separator or sieve $D^2$ thereof into the space about the perforated chamber, escaping through the opening $A^3$ of the fan-blower box, in connection with other blasts correspondingly produced, to the open air. A suction or blast of air is also similarly caused up through the divided spout Y, and from thence into the common spout X, where, uniting with the blasts from the spouts W W, it passes, in common with the same, through the separator $D^2$ into the box A, as before described, a current of air being caused down through the interior of the perforated cylinder, entering it at its top through the apertures $c\ c$ and escaping at the bottom through the apertures $c\ c$ thereat, and also through the perforations of its sides, into the surrounding chamber F, and thence out through the fan-chamber, as before explained. These several air-currents are all represented by red arrows in the drawings, and it is obvious, without further description, that a downward current of air is thus produced on both the inside and outside of the perforated cylinder, through which the wheat passes.

From the above it is manifest that as the wheat passes from the trough $m^2$ down and into the perforated chamber it is subjected to the air-blast moving upward through the spout Y, which necessarily carries with it a large quantity of the smut, dust, &c., contained in it, the wheat, when in the said perforated chamber, being thoroughly scoured and beaten by the revolving beater T, which separates from it all remaining impurities that, by the suction of air upon the outside of the said chamber, are drawn through its perforations into the space F and thence to the fan-box, on the bottom of which it falls, or from which it escapes through its opening $A^3$, the clean wheat passing through the spouts $B^2$ $B^2$ out of the machine into the spouts W W, where it falls into any suitable vessel or receiver.

The refuse matters carried with the air-blast up the spout Y enter the common spout X, where the dust, &c., is drawn through the seive $D^2$ into the box A, and the offal passes down and out at the orifice $h^2$ into any suitable receptacle therefor.

In conclusion, it may be here remarked that with my improved smut-machine the wheat or grain, from the moment it enters the same, is subjected to a continual and series of air-blasts, as well as to the operation of a beater or scourer, and that, in view of the arrangement of the air-spouts and other portions of the machine, a perfect cleansing of the wheat cannot fail of being obtained.

To regulate the downward current of air around the perforated chamber through the openings $S^2$ $S^2$ in its top I have arranged upon and over the same a plate, $K^3$, having openings $l^3$ $l^3$, by moving which plate to the right or left, so as to bring the openings $l^3$ over the opening $S^2$ $S^2$, or only partially so, or cause the plate to entirely close them, a greater or lesser current of air can be obtained, or none at all, as may be most desirable.

I do not claim, broadly, the use of a fan-case, perforated, concave or chamber, blast-spouts, &c., for they have all been used; neither do I claim a central draft of air within and through the perforated cylinder, for it also has been used; but What I do claim as new, and desire to secure by Letters Patent, is—

The combination of the perforated concave D, fan J, below said concave, the beaters U, air-regulator $k^3$, and air-conductors W X Y, all arranged, as herein specified, to force the air in separate downward currents within, around, and outwardly through the perforated walls of the concave, the external current being governed by the regulator $k^3$, and all the currents mingled with the dust in the fan-case below.

The above specification of my invention signed by me this 1st day of September, 1865.

S. B. WILLIAMS.

Witnesses:
EDWARD WILLIAMS,
WM. ALEXANDER.